Dec. 16, 1947. W. J. PETERSON 2,432,933
JETTISONING MECHANISM FOR AIRCRAFT PROPELLERS
Filed March 22, 1943 2 Sheets-Sheet 1
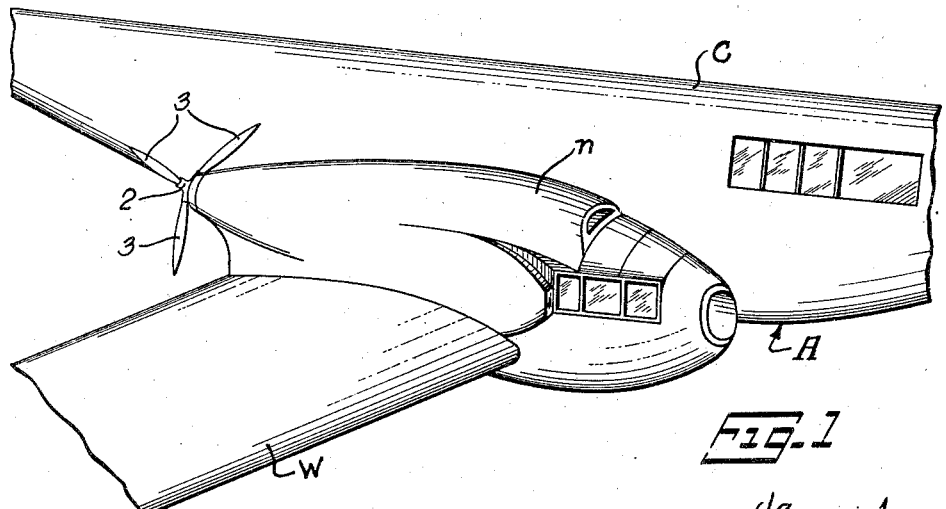
Fig. 1
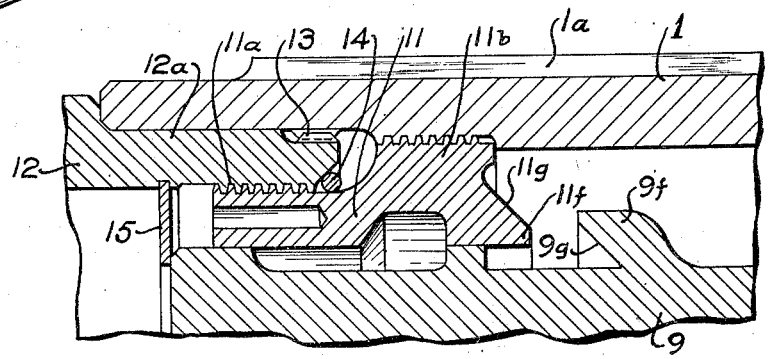
Fig. 3
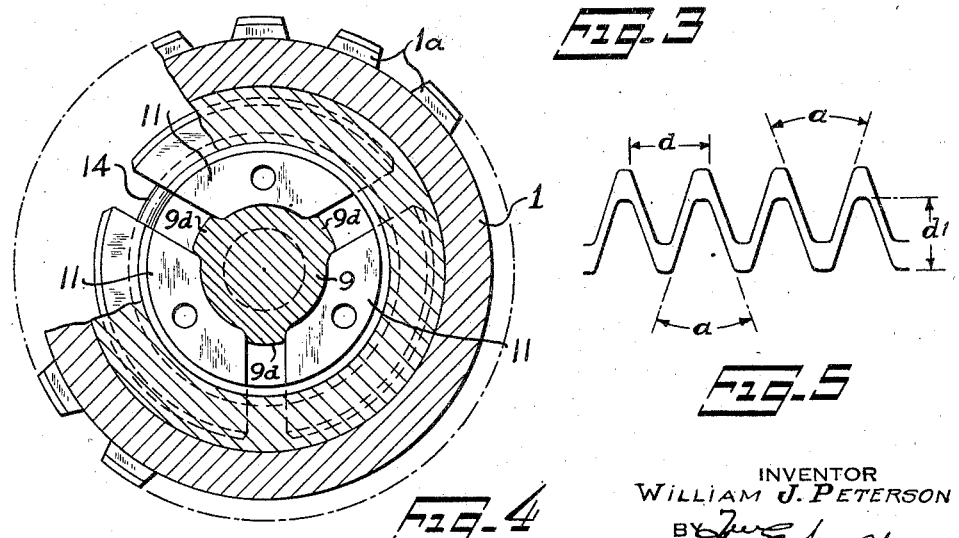
Fig. 4
Fig. 5
INVENTOR
WILLIAM J. PETERSON
BY
ATTORNEY

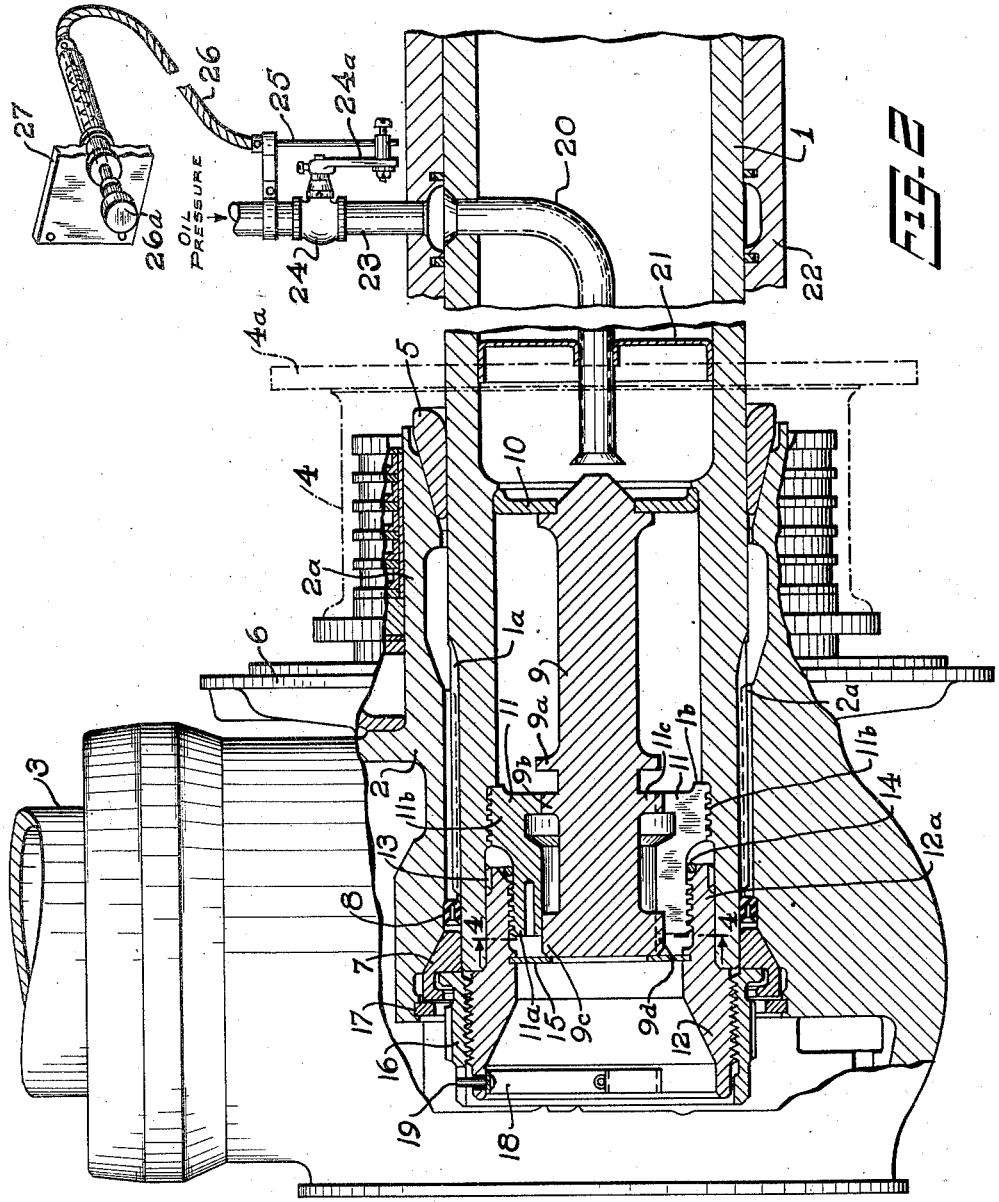

Patented Dec. 16, 1947

2,432,933

UNITED STATES PATENT OFFICE 2,432,933

JETTISONING MECHANISM FOR AIRCRAFT PROPELLERS

William J. Peterson, West Caldwell, N. J., assignor to Curtiss-Wright Corporation, a corporation of Delaware Application March 22, 1943, Serial No. 480,106

9 Claims. (Cl. 170—177)

My invention relates to jettisoning mechanism for aircraft propellers.

In accordance with my invention, an aircraft propeller hub is secured to its operating shaft by mechanism of such character that, when actuated, it releases the propeller hub from its supporting shaft.

Further in accordance with my invention, the aforesaid mechanism for securing the propeller hub to its operating shaft comprises connecting members normally maintained in non-collapsed position for holding said propeller hub to said shaft, the connecting members being readily movable to collapsed position when it becomes desirable to jettison the propeller, said connecting members, when collapsed, being ineffective to hold the propeller hub on its shaft.

Various other objects, advantages and features will become apparent from the following detailed description.

My invention resides in the jettisoning mechanism for aircraft propellers, combinations and arrangements of the character hereinafter described and claimed.

For an understanding of my invention and for an illustration of some of the forms thereof, reference is to be had to the accompanying drawings, in which:

Figure 1 is a perspective view showing part of an airplane having a pusher type propeller;

Fig. 2 is a vertical sectional view, partly in elevation, showing an arrangement for detachably supporting the airplane propeller on its driving shaft;

Fig. 3 is a vertical sectional view, showing a modification of the invention;

Fig. 4 is a transverse vertical sectional view, partly in elevation, taken on the line 4—4 of either Fig. 2 or Fig. 3; and Fig. 5 is a diagrammatic view illustrating a feature of the invention.

Referring to Fig. 1, I have shown an airplane A which comprises a cabin c having a wing w extending from one side thereof, the wing w supporting a nacelle n in which is disposed an engine, not shown, for operating a propeller shaft 1, Figs. 2, 3 and 4, the end of the shaft 1 which projects from the rear of the nacelle n supporting a propeller hub 2 having a plurality of propeller blades 3 extending radially therefrom, these propeller blades 3 forming a pusher propeller as will be understood.

Should the pilot or other occupant of a pusher type airplane, for example, of the type referred to above find it necessary to drop from the airplane by parachute, there is a real danger that the slip stream will throw either the pilot, his parachute or both into a propeller or a propeller blade either while rotating or stationary. In order to avoid this danger, I provide an arrangement for securing a propeller to its shaft in such manner that, responsive to the operation of a simple control device which may be actuated just prior to the time that it becomes necessary to abandon the airplane, the propeller is released from its shaft and falls away into space thereby eliminating the aforesaid danger to the occupants of the airplane when they parachute to earth.

For a detailed description of the invention, reference is to be had principally to Fig. 2 wherein a slip-ring housing 4 is shown as comprising a plate 4a which, in suitable manner, is secured to the nose plate, not shown, of the airplane engine. The housing 4, around the shaft 1, defines an annular space within which is received a rear or inboard cone 5 closely embracing the shaft 1 and abutting the engine thrust nut.

As shown in Fig. 2, the shaft 1 and hub 2 are splined as indicated, respectively, at 1a and 2a so as to obtain a driving relation between said shaft 1 and hub 2 when the latter is located properly on said shaft 1. As illustrated, the hub 2 has an extension 2a snugly receiving within the aforesaid annular space defined by the housing 4, said extension 2a comprising an inner sloping surface which engages a corresponding sloping surface of the rear or inboard cone 5. Further, as shown in Fig. 2, the hub extension 2a carries the known slinger device 6 utilizable for supplying de-icing fluid to the propeller blades 3.

Carried by the end of the shaft 1 is a front or outboard cone 7 having an inclined face which engages a corresponding inclined face on the propeller hub 2. Disposed adjacent the inner end of the outboard cone 7 is a sealing ring 8 which encircles the shaft 1 and is utilizable for preventing the passage of lubricating material therealong.

Referring to Figs. 2 and 4, the shaft 1 is shown as being of tubular configuration and having a piston 9 disposed axially thereof, one end of said piston 9 carrying a piston head 10 having a flanged peripheral section coactable with the interior surface of said shaft 1. The piston 9 comprises three circular flanges 9a, 9b and 9c utilizable as hereinafter described, the flange 9a having somewhat great diameter than the flanges 9b and 9c.

Supported by the piston flanges 9b and 9c are three connecting members 11 each of which comprises a longitudinal section 11a, an outer flanged section 11b and an inner flanged section 11c, the exterior surface defined by the flanged section 11b and the interior surface defined by the flanged section 11c each being of segmental arcuate configuration, and each arcuate surface having its center at the longitudinal axis of the shaft 1. As shown, the exterior surface defined by each flanged section 11b is provided with circular serrations which interengage with circular serrations formed on the interior surface of the shaft 1 at the left of a flanged surface 1b thereof, Fig. 2. The piston flanges 9b and 9c comprise three ribs 9d equi-distantly spaced apart, each rib 9d being disposed between a pair of the connecting members 11.

Coactable with the connecting members 11 and with the end of the shaft 1 is a nut member 12 which comprises a tubular section 12a having, on its interior surface, circular serrations which interengage with circular serrations formed exteriorly on the longitudinal section 11a of each connecting member 11. The tubular nut member section 12a is splined to the interior surface of the shaft 1 as indicated at 13. The end of said tubular nut member section 12a toward the right, Fig. 2, is beveled to form a pocket for an assembly spring 14 utilizable as hereinafter described. Supported by the interior surface of the tubular member 12 is a ring 15 engaged by the adjacent end of the piston 9, said ring 15 being utilizable for preventing unintended movement thereof in a direction from right to left, Fig. 2.

The nut member 12 has threaded thereto a propeller nut 16 having at the end thereof toward the right, Fig. 2, a circular flanged section disposed in interleaving relation with respect to a corresponding circular flanged section at the adjacent end of the aforesaid outboard cone 7. Carried by the extreme end of the shaft 1 is a ring 17 which is disposed immediately adjacent the outboard cone 7.

Disposed interiorly of the nut member 12, at the end thereof toward the left, Fig. 2, is a ring 18 carrying a pin 19 which extends through a passage provided therefor in the nut member 12. This arrangement constitutes a safety device preventing unintended motion of the propeller nut 16 with respect to the tubular member 12.

Referring to Fig. 2, a pipe or conduit 20 is shown as secured to and interiorly of the propeller shaft 1 for rotatable movement therewith. The pipe 20 terminates adjacent the piston 9 and its head 10, the open end of said pipe 20 being disposed in a chamber formed in part by a diaphragm 21 disposed transversely in said shaft 1. The other end of the pipe 20 extends through a passage provided therefor in the shaft 1 and communicates with a chamber defined by a fixed collar 22 which, in suitable manner, is sealed on the exterior surface of said shaft 1. Communicating with said chamber defined by the collar 22 is a pipe 23 which, in the example shown, is connected to a suitable source of pressure, for example, a high pressure extension of the oiling system of the engine utilizable for operating the disclosed propeller.

In accordance with the form of the invention shown in Fig. 2, passage of oil through the pipe 23 is controlled by a valve 24 having a handle 24a which is actuated by a Bowden wire arrangement comprising a wire 25 disposed in a cable 26, the wire 25 terminating in a suitable knob 26a associated with a panel 27 suitably located, for example, in front of the airplane pilot.

In order to assemble the mechanism herein disclosed, the inboard cone 5 is seated in the position shown in Fig. 2 whereupon the propeller hub 2 is positioned on the shaft 1 as illustrated.

Thereupon, the piston 9 is disposed interiorly of the shaft 1 in a position slightly to the left of that shown in Fig. 2, i. e., in such position that the channel between the piston flanges 9a and 9b is disposed in the position occupied by the flange 9b in the illustration of Fig. 2. At this time, the three connecting members 11, with the spring 14 disposed therearound, are disposed around the piston 9 between the piston ribs 9d and in collapsed position, i. e., with the flanged sections 11c thereof received in the aforesaid piston channel between the flanges 9a, 9b and with the longitudinal sections 11a thereof received in the piston channel between the flanges 9b and 9c.

At this time, the nut member 12 is positioned as shown in Fig. 2 and, by a suitable tool cooperative with the passages longitudinally formed in the respective connecting members 11, the latter are moved to the position shown in said Fig. 2 whereupon the piston 9 is also moved to the position thereof illustrated in Fig. 2. As a result, the piston flange 9b is moved beneath the inner flanged sections 11c of the connecting members 11, the piston flange 9c is moved beneath the ends of the longitudinal sections 11a of said connecting members 11, and the ends of said connecting members 11 at the right are seated against the flanged surface 1b of the shaft 1. Upon completion of this operation, it will be understood that the serrations on the flanged sections 11b of the connecting members 11 are interengaged with the serrations on the interior of the shaft 1, and that the serrations on the longitudinal sections 11a of the connecting members 11 are interengaged with the serrations on the nut member 12.

After the piston 9 has been moved to the position thereof shown in Fig. 2 as described above, the ring 15 is disposed in its seat to thereby releasably hold said piston 9 in its operative position.

After completion of the operations described above, the outboard cone 7 is seated at the end of the shaft 1 and engaged by the propeller nut 16 which is now threaded onto the nut member 12 until it takes the position thereof shown in Fig. 2. As a result, the propeller hub 2 is seated firmly in position on the shaft 1 between the cones 5 and 7.

As final steps of the assembling operation, the rings 17 and 18 are associated, respectively, with the propeller hub 2 and the nut member 12.

Normally, the propeller-retaining and -releasing mechanism is positioned as shown in Fig. 2 and the valve 24 is closed. The piston 9, by its flanges 9b and 9c, holds the connecting members 11 in non-collapsed position as shown whereby all of the previously described sets of circular serrations are held in engagement. As a result, therefore, the shaft 1 has the connecting members 11 locked thereto and the latter, in turn, lock the nut member 12 in the position shown. Obviously, with said nut member 12 thus positioned, the propeller nut 16 coacts with the outboard cone 7 to thereby retain the propeller hub 2 on the end of the shaft 1.

If, during flight, it becomes necessary for the occupants of the aircraft A to descend therefrom by parachute, one of the occupants, preliminarily, pulls the wire 25 by its knob 26a to thereby open the valve 24 whereby the aforesaid high pressure is applied against the piston 9 and its head 10. As a result, the piston 9 is moved from right to left, Fig. 2, until the flanges 9b, 9c thereof clear the connecting members 11, the ring 15 readily yielding to permit this movement. When this happens, the longitudinal section 11a of each connecting member 11 drops into the space between the piston flanges 9b, 9c and the inner flanged sections 11c of each connecting member 11 drops into the space between the piston flanges 9a, 9b. Accordingly, the nut member 12 is freed from locking engagement with the shaft 1 through the intervening connecting members 11. This action effectively releases the propeller hub 2 from said shaft 1 and, by action of the slip stream on the propeller blades 3, the assembly comprising the propeller hub 2, the propeller blades 3, the slinger device 6, the outboard cone 7, the ring 17, the nut 16 and the nut member 12 is separated from the propeller shaft 2 and falls through space from the airplane A.

This action is assisted by the piston 9 as movement thereof from right to left continues beyond the position last described. Thus, the piston flange 9a engages the flanged sections 11a of the connecting members 11 and moves the latter toward the left until engagement thereof is effected with the nut member 12. Thereafter, energy transmitted to the piston 9 by pressure of the oil is utilized to force the aforesaid assembly from the shaft 2.

In order to insure positive disengagement of the various sets of interengaged serrations when the piston 9 is moved from right to left as described above, it is desirable for each set of serrations to be constructed generally in accordance with the diagrammatic illustration of Fig. 5 wherein the distance $d$ is 0.063 inch, the distance $d1$ is 0.057 inch, the included angle $a$ of each serration being 40 degrees. This included angle $a$ of each serration should be such that any axial load on the connecting members 11 will tend to force them toward the center of the shaft 1, and said included angle should be greater than twice the friction angle for the materials forming the shaft 1, the connecting member 11 and the nut member 12. It shall be understood, however, that the invention is not to be limited as noted above because the dimensions and angularity of the serrations may differ to some extent from the preferred form described above.

Referring to Fig. 4, it will be noted that the serrations on the flanged section 11b of each of the connecting members 11 are formed with beveled ends. This is desirable because obviating a binding tendency between the serrations last noted and those on the interior surface of the shaft 1.

In Fig. 3, I have shown a modified form of the invention wherein a flange 9f is substituted for the aforesaid piston flange 9a, the flange 9f comprising an inclined surface 9g. In addition, each of the connecting members 11 comprises an axially extending section 11f and each of these sections is inclined as indicated at 11g.

As will be understood, movement of the piston 9 from right to left, Fig. 3, causes the inclined surface 9g of the flange 9f to engage the inclined surface 11g of each connecting member section 11f. As a result, each connecting member 11 is positively forced toward the center of the shaft 1 to thereby effectively separate the interengaged sets of serrations.

Although in Fig. 2, I have shown a Bowden wire arrangement for producing the desired movement of the piston 9 to propeller-releasing position, it shall be understood that the invention is not to be thus limited. Other equivalent arrangements may be utilized and, particularly, there may be utilized a firing arrangement for a cartridge wherein the gases developed by the exploding cartridge are forced along a pipe and caused to engage the piston 9 and its head 10 to produce the desired movement thereof. Or, the pressure of any suitable medium may be applied through the pipe 20, or equivalent, for the purpose desired.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In combination, a propeller shaft, a propeller hub splined thereon, retaining means for holding said propeller hub on said shaft, a plurality of members disposed in collapsible relation and having sets of serrations adapted to engage sets of serrations on said retaining means and on said shaft respectively, a piston disposed interiorly of said shaft, said piston being constructed and arranged to retain said members in non-collapsed relation whereby the respective sets of serrations are interengaged to cause said retaining means to hold said propeller hub on said shaft, and means for moving said piston with respect to said shaft whereby said members are free to gravitate toward said shaft with consequent disengagement of the respective serrations.

2. The combination of claim 1 wherein means are provided for positively disengaging the respective sets of serrations in response to movement of said piston as specified.

3. In combination, a hollow propeller shaft, a propeller hub splined thereon, a nut member, a propeller nut threaded to said nut member for retaining the propeller hub on said shaft, a plurality of connecting members disposed within said shaft, each of said connecting members having sets of serrations engageable, respectively, with sets of serrations on said shaft and on said nut member, and a piston disposed within said shaft and coactable with said connecting members to maintain the respective sets of serrations in engagement, said piston being movable to a position wherein said connecting members collapse with respect to said shaft and said nut member to thereby disengage the respective sets of serrations.

4. In combination, a hollow propeller shaft, a propeller hub splined thereon, cones carried by said shaft for engagement with the respective opposite ends of said propeller hub, a nut member having a tubular section disposed within the end of said shaft, a propeller nut threaded to said nut member, said propeller nut engaging one of said cones to hold it in engagement with said propeller hub and to hold said propeller hub in engagement with the other cone, a plurality of connecting members disposed within said shaft, each of said connecting members having sets of serrations engageable, respectively, with sets of serrations on said shaft and on said nut member, and a piston disposed within said shaft and coactable with said connecting members to maintain the respective sets of serrations in engagement, said piston being movable to a position wherein said connecting members collapse with respect to said shaft and said nut member to thereby disengage the respective sets of serrations.

5. In combination a hollow propeller shaft, a propeller hub splined thereon, a nut receiving member, a propeller nut threaded to said member for retaining the propeller hub thereon, a plurality of connecting members having abutments engageable respectively with coacting abutments formed on said shaft and nut member, said connecting members being displaceable to disengage at least part of said abutments, a member movable in said shaft to one position to hold said connecting member abutments in engagement with said coacting abutments, and movable to another position to release said connecting members from said coacting abutments.

6. In combination a hollow propeller shaft, a propeller hub splined thereon, a nut receiving member, a propeller nut threaded to said member for retaining the propeller hub thereon, a plurality of connecting members having abutments engageable respectively with coacting abutments formed on said shaft and nut members, said connecting members being displaceable to disengage at least part of said abutments, a member movable in said shaft to one position to hold said connecting member abutments in engagement with said coacting abutments, movable to another position to release said connecting members from said coacting abutments, and means remotely operable for moving said movable member from said one position to the other position.

7. In combination; a hollow propeller shaft; a propeller mounted on said shaft; a member mounted at the outer shaft end; means engageable with said member for releasably locking said member to said shaft; means within the hollow of said shaft operable in an emergency to release said member-locking-means; and means engageable with said member for releasably locking said propeller to said member and to said shaft, said last mentioned means being operable independently of said member-locking-means to admit of the removal of the propeller along and off the end of both said shaft and said member.

8. In combination; a hollow propeller shaft; a propeller mounted on said shaft; a member mounted at the outer shaft end, said member, throughout a portion of its length, being extended into the hollow of said shaft; means engageable with said extended member end-portion for releasably locking said member to said shaft; means within the hollow of said shaft operable in an emergency to release said member-locking-means; and means engageable with that portion of said member extended beyond the outer end of said shaft for releasably locking said propeller to said member and to said shaft, said last mentioned means being operable independently of said member-locking-means to admit of the removal of the propeller along and off the end of both said shaft and said member.

9. In combination; a hollow propeller shaft; a propeller mounted on said shaft, said member throughout a portion of its length being extended into the hollow of said shaft, and throughout the remaining portion of its length being extended beyond the outer shaft end, said outwardly extended member-portion having an overall outside diameter not greater than the overall outside diameter of said shaft; means engageable with the inwardly extended end-portion of said member for releasably locking said member to said shaft; means within the hollow of said shaft operable in an emergency to release said member-locking-means; and means engageable with the outwardly extended end-portion of said member for releasably locking said propeller to said member and to said shaft, said last mentioned means being operable independently of said member-locking-means to admit of the removal of the propeller along and off the end of both said shaft and said member.

WILLIAM J. PETERSON.

REFERENCES CITED

The following references are of record in the file of this patent:

UNITED STATES PATENTS

| Number | Name | Date |
|---|---|---|
| 1,769,801 | McCauley | July 1, 1930 |
| 1,863,388 | Woolson | June 14, 1932 |
| 1,672,163 | Krammer | June 5, 1928 |
| 1,974,356 | Edwards | Sept. 18, 1934 |
| 170,711 | Chase et al. | Dec. 7, 1875 |

FOREIGN PATENTS

| Number | Country | Date |
|---|---|---|
| 64,890 | Austria | Dec. 1, 1913 |